J. B. DALTON.
PACKAGING ICE CREAM.
APPLICATION FILED JAN. 12, 1920.
Reissued June 22, 1920. 14,887.
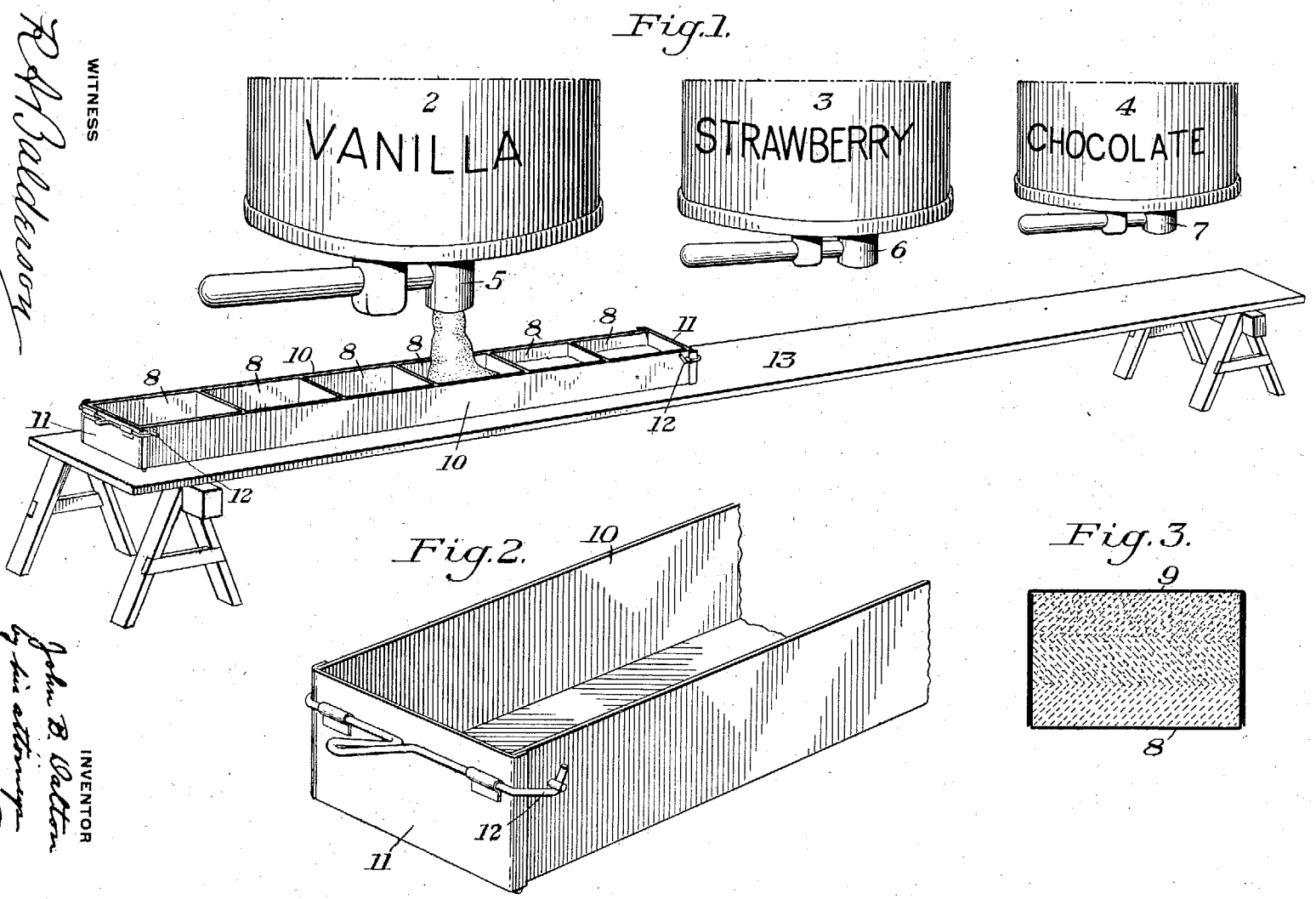
WITNESS
R. A. Balderson
INVENTOR
John B. Dalton
by his attorneys
Bakewell, Byrnes & Bramler

UNITED STATES PATENT OFFICE.

JOHN B. DALTON, OF PITTSBURGH, PENNSYLVANIA.

PACKAGING ICE-CREAM.

14,887. Specification of Reissued Letters Patent. Reissued June 22, 1920.

Original No. 1,313,793, dated August 19, 1919, Serial No. 282,371, filed March 13, 1919. Application for reissue filed January 12, 1920. Serial No. 351,054.

*To all whom it may concern:*

Be it known that I, JOHN B. DALTON, a citizen of the United States, residing at Pittsburgh, in the county of Allegheny and State of Pennsylvania, have invented a new and useful Improvement in Packaging Ice-Cream, of which the following is a full, clear, and exact description, reference being had to the accompanying drawings, forming part of this specification, in which—

Figure 1 is a diagrammatic perspective view showing the filling of the containers.

Fig. 2 is a perspective view showing one end of the container holding trough, and Fig. 3 is a vertical section through the container as filled with ice cream.

The present invention relates to packaging ice cream and more particularly to the packaging of ice cream in the paper containers in which it is delivered to the customer.

The object of the invention is to minimize the handling of the ice cream and to provide a more economical and more sanitary method of procedure. With this object in view the present invention consists in the method of packaging ice cream and the article produced thereby, as hereinafter described and more particularly pointed out in the claims.

In making brick ice cream, the usual commercial method used heretofore has been as follows:—A long metal mold was filled with the ice cream and put away to chill and thereby harden. After chilling, which usually occupied from 12 to 24 hours, the mold was dipped in hot water and the long block of ice cream dumped out onto a bench. An operator then severed the long block of ice cream into a number of bricks of the desired size. These bricks were then seized by the hand of the operator, wrapped in paper and put into paper containers. The containers containing the bricks thus cut were then put into the chilling room to repair the softening to which the ice cream was subjected during the cutting into the individual bricks.

Although this method gave an article which the trade desired, namely, a brick of ice cream contained in a paper box which went to the user and was thrown away after use, this method was not only expensive but unsanitary. The ice cream had to be first chilled, then manipulated by the operator who generally seized the bricks with his fingers, often leaving thumb marks which persisted in the bricks when delivered to the customer. The ice cream had to be chilled twice, once in the large brick and afterward in the smaller bricks.

It has also been the practice in supplying the customer, for the dealer, such as a druggist, or soda fountain proprietor, to purchase ice cream in large freezers and then to dip out the ice cream when purchased by the customer and fill paper buckets with it. This has been unsatisfactory both for the dealer and the customer. The customer notes that there are voids in the ice cream which is necessarily dipped out in the hardened condition, and thinks he is getting short measure. On the other hand, the dealer in order to satisfy the customer presses down the ice cream into the paper bucket thereby causing its sides to bulge and giving the customer actually more than the rated capacity of the bucket.

In order to overcome the objections to the previous process and to deliver the ice cream to the customer in a paper container fully filled with the ice cream, I fill the paper container with the ice cream while the ice cream is in a plastic condition and thereafter chill the ice cream in the paper container. This obviates any manual contact with the ice cream after it is drawn from the freezer and before the paper container is opened by the customer. It also insures that the customer receives his paper container fully filled with the ice cream. In filling the container, which is usually a rectangular paper box, I preferably support the sides of the container while it is being filled, and thereby prevent the sides from bulging, which would make an unsightly package and also cause it to contain more ice cream than it should.

Referring now to the drawings which illustrate an apparatus for carrying out my method; three freezers are indicated by reference numerals 2, 3 and 4. The three freezers are supplied with spouts 5, 6 and 7, respectively. The ice cream in the freezers is in a plastic or semi-liquid condition so that it flows readily through the spouts as will be understood by any one skilled in the commercial ice cream making art.

The paper containers which are illustrated as of the box type consist of a body portion 8, an da cover 9, which fits over or telescopes over the body portion. The telescoping cover conceals the sides of the body portion and hides any ice cream which may have been spilled on them during the filling operation thus insuring a clean appearing package. The telescoping cover also helps to support the sides of the box during the freezing of the semi-liquid ice cream in the refrigerating room. The box with its closely fitting cover, as shown in Fig. 3, forms a substantially leak-proof container from which the ice cream cannot leak and into which water cannot penetrate. The containers or boxes are made of heavy paraffined paper. The word "paper," as applied to the material from which the containers are made, is intended as a word of general description and not of limitation, and to include paper or like materials which are commonly used for such purposes.

The body portions 8 of a number of containers are placed in a long open topped metal trough or magazine 10. This trough is made of such a length that it will hold a predetermined number of containers. As placed in this trough, the sides of each container are supported either by the walls of the trough or by the sides of adjacent containers. The trough 10 has hinged ends 11 which are retained by latches 12.

After the containers, or more strictly speaking, the body portions 8 of the paper boxes, are placed in the trough 10, one end of the trough 10 is placed beneath one of the spouts and is then moved along on the bench 13 under the spout. The stream of ice cream is allowed to flow from the spout without interruption as the trough with its containers is moved along under its spouts. As the containers are placed close side by side, this permits them to be filled quickly but without spilling the ice cream.

In case the bricks are to be made all of one flavor, the trough is moved along so as to permit the several containers to be fully filled. In case the bricks are to be layer bricks, the trough is moved along to fill the containers to the proper depth to form the layers of the different flavors of ice cream.

As shown in Fig. 1, three freezers of vanilla, strawberry and chocolate ice cream are provided to make a three-layer brick. However, if a vanilla brick is desired, only the vanilla freezer need be used. After the containers are filled, the ends 11 of the trough 10 are let down and a row of paper boxes are shoved onto a bench where an operator applies the covers to the containers. The containers are then placed in the cooling room where the ice cream is chilled from twelve to twenty-four hours to harden it. The ice cream is entirely surrounded, top, sides and bottom, with the heavy paper which is a poor conductor of heat and thereby insures a slow freezing of the semi-liquid ice cream into a smooth uniform creamy brick and prevents its freezing into an icy condition. The ice cream is sealed against possible contamination from the time the box is filled until it is opened by the consumer. The heavy paraffined paper box retains its shape after it is filled and during the freezing in the cold room, so the consumer receives the container as shown in Fig. 3, fully filled but having its original intended shape and capacity. The containers are then removed from the cooling room, preferably wrapped with an outside wrapping paper and are in condition to be delivered to the customer.

The present process is intended for making what is known to the trade as brick ice cream, that is, sizes suitable for domestic or retail consumption. Such bricks are made in quarts, pints, or fractions thereof, as contrasted with ice cream put up in containers holding several gallons which are supplied to dealers. In freezing ice cream in such small sizes from the semi-liquid mixture, the tendency is for it to freeze too quickly in the cooling room and thereby form ice crystals. I prevent this by entirely inclosing the body of semi-liquid ice cream mixture on all sides with the heavy paper box, which as above pointed out, insures a slow and uniform freezing of the comparatively small body of ice cream.

While the method and the article of the present invention have been specifically illustrated and described, it is to be understood that the invention is not limited to the details of description, but may be varied and otherwise practised within the scope of the following claims:

I claim:

1. The method of packaging ice cream in merchantable bricks for delivery to the ultimate consumer, which consists in flowing without subjecting to pressure, ice cream in the semi-liquid condition as drawn off from a so-called "freezer" into water-proof paper boxes of a capacity suitable for domestic consumption, placing water-proof paper covers on the packages so as to entirely surround and seal the ice cream in the boxes, and then placing the boxes in a refrigerating room and there freezing the semi-liquid ice cream to a hardened condition while so inclosed in the paper boxes, said boxes forming the sole supporting means for the ice cream during the said freezing thereof, substantially as described.

2. The method of packaging ice cream in merchantable bricks for delivery to the ultimate consumer, which consists in flowing ice cream in a semi-liquid condition and without subjecting it to pressure into boxes of a capacity suitable for domestic consumption and made of paper capable of supporting their shape after the boxes are filled with the semi-liquid ice cream, placing paper covers on the boxes so as to entirely surround and seal the ice cream with paper, and then placing the boxes in a refrigerating room and there freezing the semi-liquid ice cream to a hardened condition while so inclosed in the paper boxes, said heavy paper boxes also insuring a slow penetration of the cold and a slow and uniform freezing of the ice cream from the semi-liquid to the solid state, substantially as described.

3. The method of packaging ice cream in merchantable bricks for delivery to the ultimate consumer, which consists in flowing ice cream in a semi-liquid condition and without subjecting it to pressure into paper boxes of a size suitable for domestic consumption, placing on the boxes telescoping paper covers which conceal and assist in supporting the sides of the boxes, and then placing the thus filled boxes in a refrigerating room and there freezing the semi-liquid ice cream to a hardened condition while so inclosed in the paper boxes, said boxes forming the sole supporting means for the ice cream during the freezing thereof, substantially as described.

JOHN B. DALTON.